UNITED STATES PATENT OFFICE.

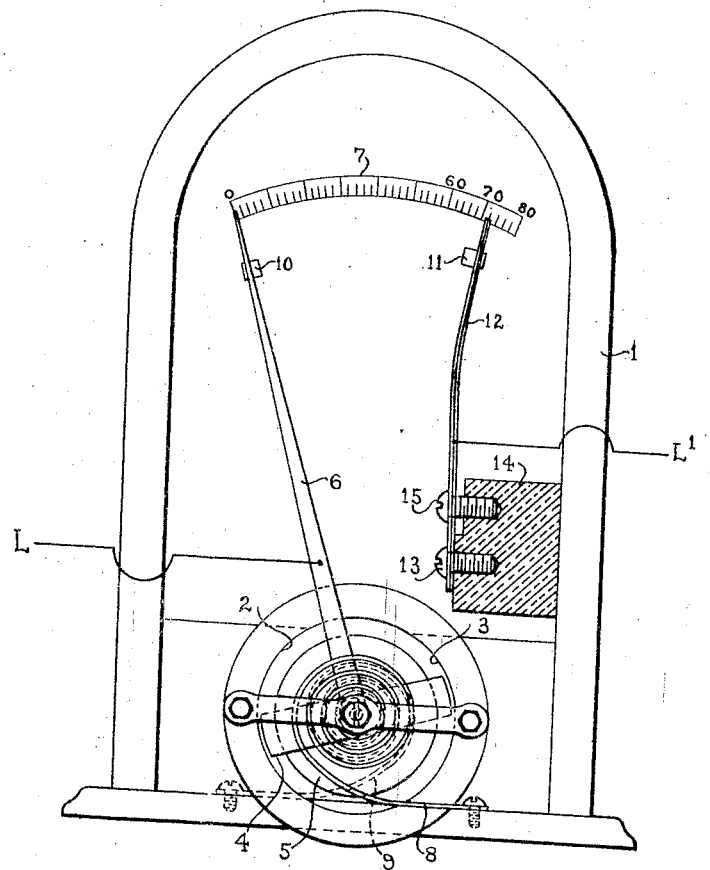

GUY R. RADLEY, OF MILWAUKEE, WISCONSIN, ASSIGNOR TO THE CUTLER-HAMMER MFG. CO., OF MILWAUKEE, WISCONSIN, A CORPORATION OF WISCONSIN.

MEASURING DEVICE.

1,410,120.  Specification of Letters Patent.  Patented Mar. 21, 1922.

Application filed February 14, 1921. Serial No. 444,680.

*To all whom it may concern:*

Be it known that I, GUY R. RADLEY, a citizen of the United States, residing at Milwaukee, in the county of Milwaukee and State of Wisconsin, have invented new and useful Improvements in Measuring Devices of which the following is a full, clear, concise, and exact description, reference being had to the accompanying drawing, forming a part of this specification.

The invention relates to measuring devices and more particularly to energy measuring devices having an indicating element associated therewith.

Such devices are sometimes employed in control systems to make or break an electric circuit when the energy measured by the device is of a given value. In certain systems it is desirable to automatically vary in accordance with temperature variations the range of operation of the device required for effecting the desired control and the present invention has among its objects to provide a measuring device of the aforesaid character wherein the indicating element may function for indication independently of temperature changes.

Another object is to provide a device of the aforesaid character having co-operating contacts controlled by the indicating element thereof, the relative position of said contacts being varied by temperature variations.

Various other objects and advantages of the invention will hereinafter appear.

The accompanying drawing illustrates one form which the invention may assume in practice and the same will now be described it being understood that the invention may be embodied in numerous other forms without departing from the scope of the appended claims.

Referring to the drawing the same illustrates an electrical measuring device of the D'Arsonval type including a permanent magnet 1 having pole faces 2 and 3, a moving coil 4 arranged between said faces and carried by a pivoted supporting member 5. The supporting member 5 is connected to an indicating member 6 which is movable over a scale 7 and said supporting member is biased towards the zero position shown by oppositely arranged spiral springs 8 and 9 which are respectively connected to opposite terminals of coil 4. As is understood the moving coil 4 is supplied with current through springs 8 and 9 and the same responds to vary the position of the indicating member 6 in accordance with the value of the current supplied thereto.

The measuring device is provided with contacts 10 and 11 for controlling a circuit indicated by lines L and L', the former contact being mounted on indicating member 6 and the latter contact being carried by a thermostatic element 12. The thermostatic element comprises a vertically arranged bi-metallic strip having the contact 11 secured thereto adjacent the upper end thereof and having its lower end anchored by a screw 13 to an insulating block 14 mounted on magnet 1. The upper end of the thermostatic element 12 is arranged adjacent scale 7 for indicating purposes and said element has an adjusting screw 15 passing therethrough and threaded into block 14 for adjusting the position of the upper end thereof with respect to scale 7.

As is well known the thermostatic element 12 bends in response to thermic variations and the same will therefore vary the position of contact 11 with respect to contact 10 and correspondingly vary the degrees of energization of coil 4 necessary to effect closure of contacts 10 and 11. The direction in which the thermostatic element 12 bends in response to thermic conditions is dependent upon the relative position of the strips thereof and it is thus apparent that by reversing said strips the regulating characteristics of said element can be reversed.

What I claim is new and desire to secure by Letters Patent is:

1. The combination with a device adapted to measure energy supplied thereto, said device having an indicating element responsive to an extent varying in accordance with the value of the energy supplied to said device, of co-operating contacts to be engaged and disengaged as a function of the movement of said element and means sensitive to temperature changes for automatically varying the extent of movement of said element required to effect a given change in the relation of said contacts.

2. The combination with a device adapted to measure energy supplied thereto, said device having an indicating element responsive to an extent varying in accordance with the value of the energy supplied to said device, of co-operating contacts to be closed by said indicating element upon response thereof, and a thermostatic element associated with one of said contacts for automatically varying the extent of movement of said indicating element required to effect closure of said contacts.

3. The combination with a device adapted to measure energy supplied thereto, said device having an indicating element responsive to an extent varying in accordance with the value of the energy supplied to said device, of a contact carried by said indicating element, a contact to be engaged by said former contact upon response of said indicating element, and a thermostatic element associated with said latter contact to vary the position thereof with respect to said former contact in accordance with temperature changes.

4. The combination with a device adapted to measure energy supplied thereto, said device having an indicating element responsive to an extent varying in accordance with the value of the energy supplied to said device, a contact carried by said indicating element, a contact to be engaged by said former contact upon response of said indicating element, a bi-metallic supporting strip for said latter contact and means for adjusting said strip with respect to said indicating element.

5. The combination with a device adapted to measure energy supplied thereto, said device having an indicating element responsive to an extent varying in accordance with the value of the energy supplied to said device, and an indicating scale, of a contact carried by said indicating element, a contact to be engaged by said former contact upon response of said indicating element, and a bimetallic supporting strip for said latter contact, said strip being arranged adjacent said scale for indicating purposes.

It witness whereof, I have hereunto subscribed my name.

GUY R. RADLEY.